United States Patent [19]

Hefner, Jr.; Robert E. et al.

[11] Patent Number: 5,460,860
[45] Date of Patent: Oct. 24, 1995

[54] MESOGEN-CONTAINING BIAXIALLY ORIENTED FILMS

[75] Inventors: Robert E. Hefner, Jr.; Jimmy D. Earls, both of Lake Jackson, Tex.; Peter E. Pierini, Midland, Mich.; David A. Waldman, Acton, Mass.; Lalitha Reddy, Walnut Creek, Calif.

[73] Assignee: The Dow Chemical Company, Midland, Mich.

[21] Appl. No.: 246,595

[22] Filed: May 20, 1994

[51] Int. Cl.$^6$ .......................... C08G 59/06; C08G 59/22; C08G 59/28; C08L 63/02
[52] U.S. Cl. .............. 428/1; 428/413; 428/414; 428/415; 428/417; 525/481; 525/482; 525/523; 525/526; 525/528; 525/533; 528/96; 528/97; 528/98; 528/99; 528/100; 528/101; 528/104; 264/290.2
[58] Field of Search .................. 264/290.2; 428/413, 428/414, 415, 417; 525/481, 482, 523, 526, 528, 533; 528/96, 97, 98, 99, 100, 101, 104

[56] References Cited

U.S. PATENT DOCUMENTS

| | | | |
|---|---|---|---|
| 4,333,907 | 6/1992 | Urasaki et al. | 528/193 |
| 5,266,660 | 11/1993 | Hefner, Jr. et al. | 525/481 |
| 5,268,434 | 12/1993 | Hefner, Jr. et al. | 525/529 |
| 5,270,404 | 12/1993 | Hefner, Jr. et al. | 525/481 |
| 5,270,405 | 12/1993 | Hefner, Jr. et al. | 525/481 |
| 5,276,184 | 1/1994 | Hefner, Jr. et al. | 564/80 |
| 5,288,842 | 2/1994 | Feger et al. | 525/481 |
| 5,292,831 | 3/1994 | Earls et al. | 525/523 |

FOREIGN PATENT DOCUMENTS 1165983  11/1967  United Kingdom .

OTHER PUBLICATIONS

"Process for the Formation of Biaxially Oriented Films of Poly(p–phenylene Terephthalamide) from Liquid Crystalline Solutions" by John Flood et al., in *Journal of Applied Polymer Science*, vol. 27, pp. 2965–2985 (1982).
Derwent Abstract No. 92–394761/48.
Derwent Abstract No. 81–19605D/12.

*Primary Examiner*—Frederick Krass

[57] ABSTRACT

Mesogen containing biaxially oriented films are prepared from curable mixtures containing an epoxy resin and a curing agent therefor. Certain of the mesogen containing biaxially oriented films possess unique properties, such as a metallic like, highly reflective appearance. These films are useful in adhesives, coatings, laminates or composites and the like.

18 Claims, No Drawings

MESOGEN-CONTAINING BIAXIALLY ORIENTED FILMS

FIELD OF THE INVENTION

The present invention concerns biaxially oriented films which contain rodlike mesogenic moieties. Said films are prepared from a mesogen-containing curable mixture containing an epoxy resin and a curing agent therefor.

BACKGROUND OF THE INVENTION

Biaxially oriented films prepared from liquid crystalline thermoplastics are known and include, for example, biaxially oriented poly(p-phenyleneterephthalamide) prepared by J. E. Flood, J. L. White and J. F. Fellers, *Journal of Applied Polymer Science*, 27, 2965 (1982); biaxially oriented polyester from phenyl p-hydroxybenzoate, diphenyl isophthalate and hydroquinone prepared by U. Takanori, Y. Hirabayashi, M. Ogasawara and H. Inata, European Patent Application No. 24,499 (Jun. 24, 1981); and a 50:50 blend of thermoplastic liquid crystal polyester and poly(ethylene terephthalate) coextruded with poly(ethylene terephthalate) then biaxially stretched to produce a laminated film prepared by H. Minamizawa, I. Okazaki and K. Abe, Japan Kokai Tokkyo Koho JP 04,294,125 (Oct. 19, 1992).

U.S. Pat. No. 5,266,660 teaches the preparation of a uniaxially oriented coating on glass. For example, in Example 6, a curable mixture of the diglycidyl ether of 4,4'-dihydroxybiphenyl and sulfanilamide is prepared, then placement of a portion of the curable mixture between a pair of glass plates is followed by B-staging to develop a liquid crystalline state. Uniaxial orientation is induced via shearing of the liquid crystalline resin by moving one glass plate across the top of the resin. The uniaxially oriented domains which result are maintained with continued cure of the resin.

It would be desirable to have available biaxially oriented films from mesogen containing curable compositions containing an epoxy resin and a curing agent therefor. Generally, the relatively low molecular weight of the epoxy resin and curing agent leads to greatly enhanced processing relative to the much higher molecular weight thermoplastics. This ease of processing can manifest itself in reduced melting point, faster response to the force used to induce orientation, and the like. Furthermore, the thermoset mechanism can be used to lock in the biaxial orientation induced in the films of the present invention. This is in contrast to mesogen-containing thermoplastics where a lack of crosslinking can lead to eventual relaxation of the orientation of the mesogenic moieties contained therein. According to Friedhelm Hensen, ed., *Plastics Extrusion Technology*, published by Hanser Publishers, New York, New York (1988) on page 260, a problem similar to this is encountered in non-mesogenic oriented thermoplastics: "During drawing, energy conversion takes place. After drawing, entropy effects tend to return the aligned structure to its original configuration, causing the film to shrink."

Biaxial orientation, as opposed to uniaxial orientation is preferred because the lack of orientation in the transverse to the machine direction in a uniaxially oriented film induces very large differences in the mechanical properties in the machine and transverse to the machine directions. By way of contrast, in the films of the present invention, simultaneous biaxial drawing produces nearly equivalent mechanical properties in both the machine and transverse to the machine directions. Additionally, the use of a two-stage biaxial drawing process to manufacture the films of the present invention can provide different values in the two directions as a function of the order and extent of drawing, or also can be used to provide equivalent properties in the two directions. Aside from the improvement in one or more mechanical properties, such as, but not limited to modulus, exhibited by the biaxially oriented films of the present invention, certain of the cured films exhibit a reflective, metallic-like appearance as a direct result of the biaxial drawing.

The present invention provides a heretofore unknown class of mesogen containing biaxially oriented films possessing improvements in one or more physical and/or mechanical properties.

SUMMARY OF THE INVENTION

One aspect of the present invention pertains to a biaxially oriented film prepared from a curable composition comprising (A) at least one resin having an average of more than one vicinal epoxide or vicinal thiirane group per molecule; and (B) at least one curing agent and/or curing catalyst for said epoxy or thiirane resin; and wherein 1) at least one of (A) or (B) contains one or more rodlike mesogenic moieties which provides said film with liquid crystal domains prior to, during or after curing;

(2) component (B) is present in a quantity sufficient to cure component (A);

(3) said liquid crystalline domain(s) have been biaxially oriented; and (4) optionally, said curable mixture has been B-staged.

A further aspect of the present invention pertains to a product resulting from curing the aforementioned biaxially oriented film.

A further aspect of the present invention pertains to the laminate or composite product prepared using one or more plies of the aforementioned biaxially oriented film.

A further aspect of the present invention pertains to the adhesive product prepared using one or more plies of the aforementioned biaxially oriented film.

A further aspect of the present invention pertains to the coating product prepared using one or more plies of the aforementioned biaxially oriented film.

The compositions and products of the present invention can consist of, consist essentially of or comprise the enumerated components.

The compositions and products of the present invention can be free of any component not specifically enumerated herein when desired.

DETAILED DESCRIPTION OF THE INVENTION DEFINITIONS

The term "active hydrogen" means a hydrogen which is reactive with an epoxide or thiirane group.

The term "film" as employed herein means a flat section of resin possessing a minimum thickness relative to its length and width. Typical thicknesses are dictated by the end use of the film, the mechanical strength of the film before curing (green strength), the mechanical strength of the B-staged or cured film, the components used to prepare the resin, and other such variables. Generally, the films of the present invention possess thicknesses of from about 0.1 mil to about 50 mil.

The term "biaxial" as applied to the films of the present invention, means that the films are anisotropic in the machine and transverse to the machine direction, two mutually perpendicular directions.

The term "hydrocarbyl" as employed herein means any aliphatic, cycloaliphatic, aromatic, aryl substituted aliphatic or cycloaliphatic or aliphatic or cycloaliphatic substituted aromatic groups. The aliphatic or cycloaliphatic groups can be saturated or unsaturated. Likewise, the term "hydrocarbyloxy" means a hydrocarbyl group having an oxygen linkage between it and the carbon atom to which it is attached.

The term "mesogenic" or "mesogen" as is used herein designates compounds containing one or more rigid rodlike structural units which have been found to favor the formation of liquid crystal phases in the case of low molar mass substances. The term "mesogenic moiety" as is used herein designates the rigid rodlike structural unit contained within the mesogenic compound. Thus the mesogen or mesogenic moiety is that structure responsible for molecular ordering. The term mesogenic is further defined by R. A. Weiss (ed.) and C. K. Ober (ed.) in *Liquid-Crystalline Polymers*, ACS Symposium Series 435 (1989) on pages 1–2: "The rigid unit responsible for the liquid crystalline behavior is referred to as the mesogen," and "Liquid crystalline order is a consequence solely of molecular shape anisotropy, such as found in rigid rodshaped molecules. . . " and "Liquid crystal is a term that is now commonly used to describe materials that exhibit partially ordered fluid phases that are intermediate between the three dimensionally ordered crystalline state and the disordered or isotropic fluid state. Phases with positional and/or orientational long-range order in one or two dimensions are termed mesophases. As a consequence of the molecular order, liquid crystal phases are anisotropic, i.e., their properties are a function of direction." Further definition of the term mesogenic can be found in *Polymeric Liquid Crystals*, Alexandre Blumstein (ed.), (1983) on pages 2–3: "Compounds forming small molecule thermotropic liquid crystals usually have the following molecular structural features:—high length:breadth (axial) ratio—rigid units such as 1,4-phenylene, 1,4-bicyclooctyl, 1,4-cyclohexyl, etc.,—rigid central linkages between rings such as, for example, —COO—, —CH=CH—, —N=NO—, —N=N—, etc.—anisotropic molecular polarization".

The term "inertly substituted" means that the substituent group(s) do not enter into any significant reaction with the other reactant(s) or product(s) of the reaction at the conditions employed.

The terms "curable" and "thermosettable" are used synonymously throughout and mean that the composition is capable of being subjected to conditions which will render the composition to a cured or thermoset state or condition.

The terms "cured" and "thermoset" are used synonymously throughout. The term "thermoset" is defined by L. R. Whittington in *Whittington's Dictionary of Plastics* (1968) on page 239: "Resin or plastics compounds which in their final state as finished articles are substantially infusible and insoluble. Thermosetting resins are often liquid at some stage in their manufacture or processing, which are cured by heat, catalysis, or some other chemical means. After being fully cured, thermosets cannot be resoftened by heat. Some plastics which are normally thermoplastic can be made thermosetting by means of crosslinking with other materials."

The term "curing" means subjecting the composition to be cured to conditions which effect curing i.e., to conditions which cause the composition to become "cured" or "thermoset".

The term "B-staging" or "B-staged" as employed herein designates that partial curing (thermosetting) of a curable composition has occurred. The term "B-stage" is defined in *The Epoxy Resin Formulators Training Manual*, by The Society of the Plastics Industry, Inc. (1985) on pages 270–271 as: "An intermediate stage in the reaction of certain thermosetting resins in which the material softens when heated and swells when in contact with certain liquids, but can not entirely fuse or dissolve."

The term "phenoxy-type" as employed herein means a relatively high molecular weight thermoplastic resin obtain by the reaction of a difunctional active-hydrogen-containing compound with a compound having an average of about 2 epoxide or thiirane groups per molecule or other method described herein.

NUMERICAL VALUES RECITED HEREIN

Any numerical values recited herein include all values from the lower value to the upper value in increments of one unit provided that there is a separation of at least 2 units between any lower value and any higher value. As an example, if it is stated that the amount of a component is, for example, from 1 to 90, preferably 20 to 80, more preferably from 30 to 70, it is intended that values such as 15–85, 22–68, 43–51, 30–32 etc. are expressly enumerated in this specification. Usually, for values which are less than one, one unit is considered to be 0.1; therefore, the minimum separation between any lower value and any higher value is 0.2. However, for the amounts of catalysts, one unit is considered to be 0.001, 0.01, 0.1 or 1 as appropriate. These are only examples of what is specifically intended and all possible combinations of numerical values between the lowest value and the highest value enumerated are to be considered to be expressly stated in this application in a similar manner.

EPOXY AND THIIRANE RESINS

The epoxy and thiirane resins which can be employed to prepare the mesogen-containing biaxially oriented film compositions of the present invention include essentially any epoxy-containing or thiirane-containing compound which contains an average of more than one vicinal epoxide group or vicinal thiirane group per molecule. The epoxide or thiirane groups can be attached to any oxygen, sulfur or nitrogen atom or the single bonded oxygen atom attached to the carbon atom of a —CO—O— group in which said oxygen, sulfur or nitrogen atom or the carbon atom of the —CO—O— group is attached to an aliphatic, cycloaliphatic, polycycloaliphatic or aromatic hydrocarbon group which hydrocarbon group can be substituted with any inert substituent including, but not limited to, halogen atoms, preferably fluorine, bromine or chlorine, or nitro groups, or such groups can be attached to the terminal carbon atoms of a compound containing an average of more than one —(O—CHR$^a$—CHR$^a$)$_t$— group where each R$^a$ is independently hydrogen or an alkyl or haloalkyl group, containing from one to about 2 carbon atoms, with the proviso that only one R$^a$ group can be a haloalkyl group, and t has a value from one to about 100, preferably from one to about 20, more preferably from one to about 10, most preferably from one to about 5.

Suitable such epoxy resins which can be employed to prepare the mesogen-containing biaxially oriented film compositions of the present invention include, for example, the glycidyl ethers or glycidyl amines represented by the following Formulas I, II, III, VIII, IV, V, VI, VII, VIII, IX or X.
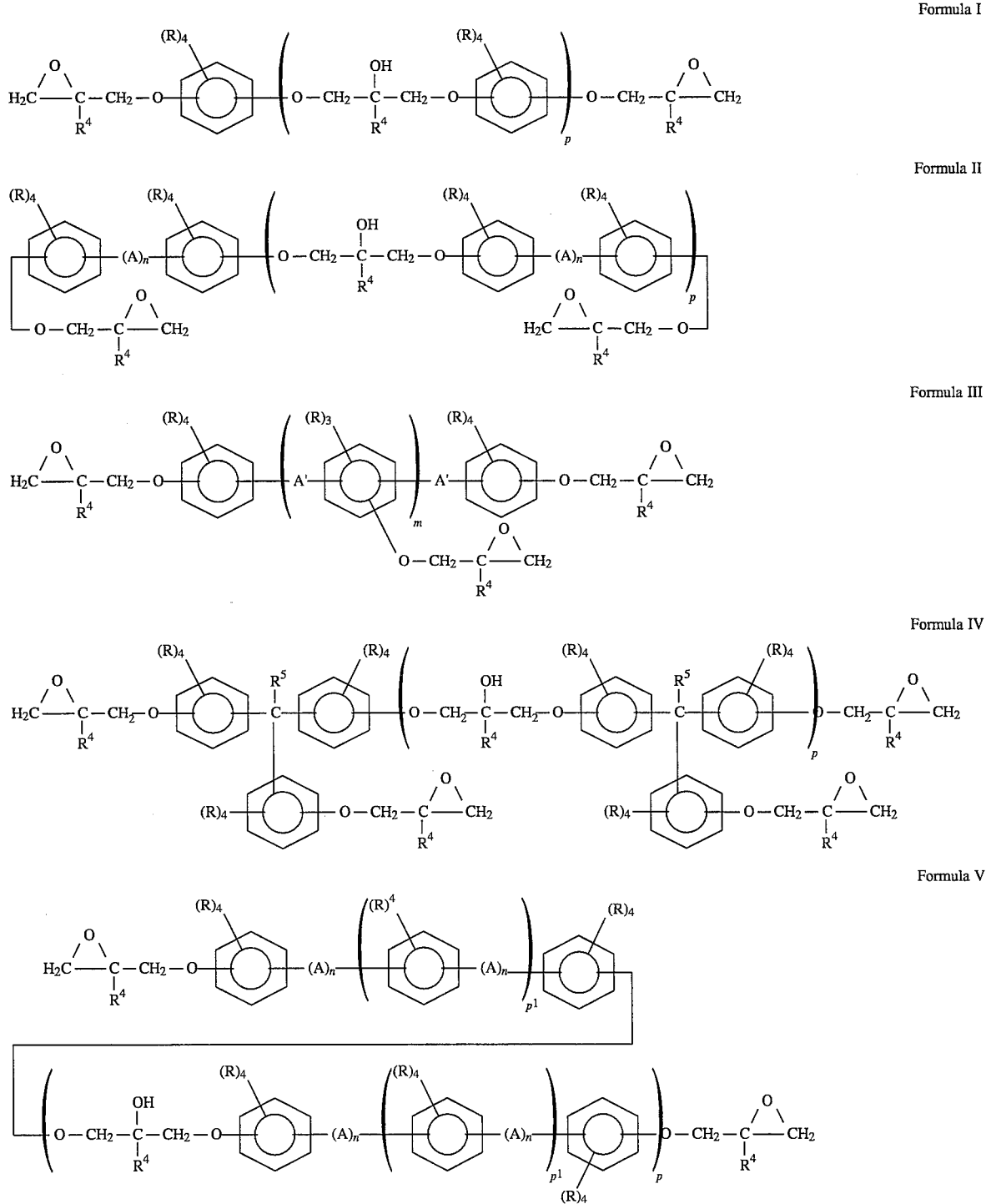

-continued

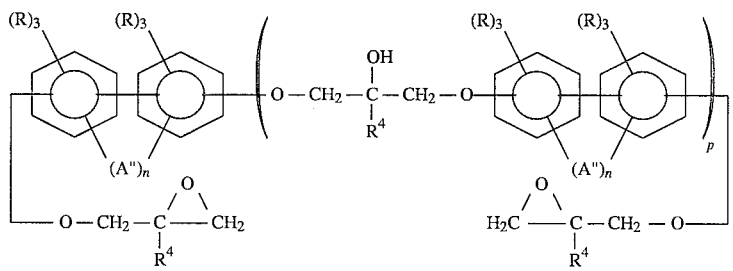

Formula VI

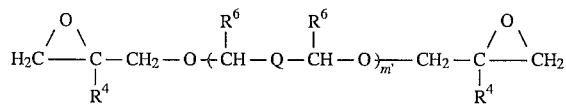

Formula VII

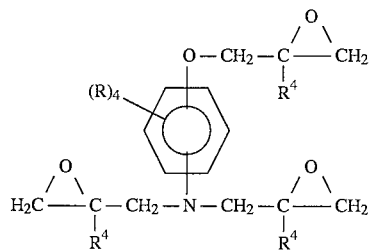

Formula VIII

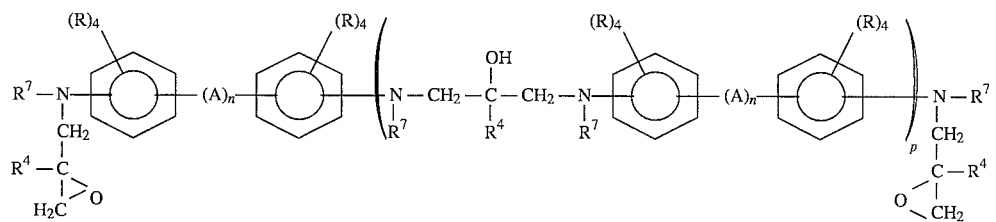

Formula IX

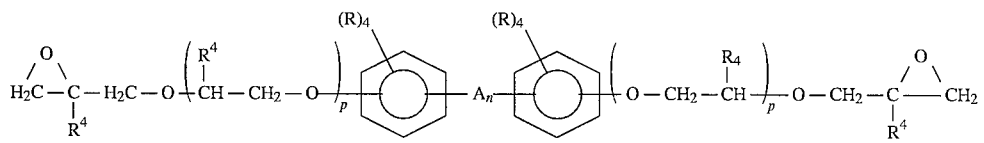

Formula X wherein wherein each A is independently a divalent hydrocarbyl group having from one to 20 carbon atoms, —O—, —CO—, —SO—, —SO$_2$—, —S—, —S—S—, a single bond, —CR$^2$=CR$^2$—, —C≡C—, —N=N—, —CR$^2$=N—, —N=CR$^2$—, —O—CO—, —CO—O—, —S—CO—, —CO—S—, —NR$^2$—CO—, —CO—NR$^2$—, —CR$^2$=N—N=CR$^2$—, —CO—CR$^2$=CR$^2$—, —CR$^2$=CR$^2$—CO—, —CO—O—N=CR$^2$—, —CR$^2$=N—O—OC—, —CO—NR$^2$—NR$^2$—OC—, —CR$^2$=CR$^2$—O—OC—, —CO—O—CR$^2$=CR$^2$—, —O—CO—CR$^2$=CR$^2$—, —CR$^2$—, —CR$^2$=CR$^2$—CO—O—, —(CHR$^2$)$_n$—, —O—CO—CR$^2$=CR$^2$—, —CR$^2$=CR$^2$—CO—O—(CHR$^2$)$_n$—, —(CHR$^2$)$_n$—CO—O—CR$^2$=CR$^2$—, —CR$^2$=CR$^2$—O—CO—(CHR$^2$)$_n$—, —CH$_2$—CH$_2$—CO—O—, —O—OC—CH$_2$—CH$_2$—, —C≡C—C≡C—, —CR$^2$=CR$^2$—, —CR$^2$=CR$^2$—C≡C—, —C≡C—CR$^2$=CR$^2$—, —CR$^2$=CR$^2$—CH$_2$—O—OC—, —CO—O—CH$_2$—CR$^2$=CR$^2$—, —O—CO—C≡C—CO—O—, —O—CO—CR$^2$=CR$^2$—CO—O—, —O—CO—CH$_2$—CH$_2$—CO—O—, —S—CO—CR$^2$=CR$^2$—CO—S—, —CO—CH$_2$—NH—CO—, —CO—NH—CH$_2$—CO—, —NH—C(—CH$_3$)=CH—CO—, —CO—CH=C(—CH$_3$)—NH—, —CR$^2$=C(—Cl)—, —C(—Cl)=CR$^2$—, —CR$^2$=C(—CN)—, —C(—CN)=CR$^2$—, —N=C(—CN)—, —C(—CN)=N—, —CR$^2$=C(—CN)—CO—O—, —O—CO—C(—CN)=CR$^2$—,

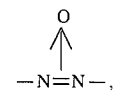

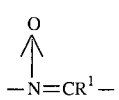

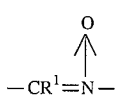

-continued
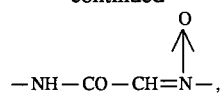
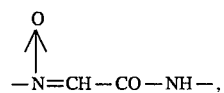
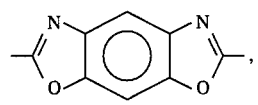
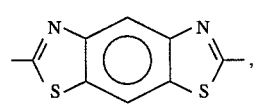
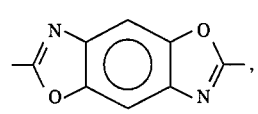
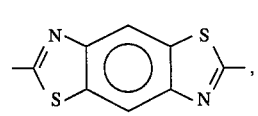
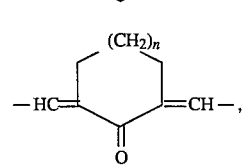
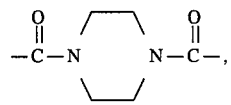
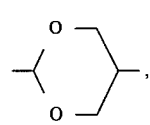
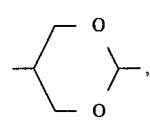
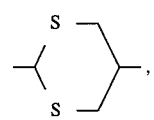
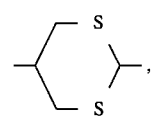
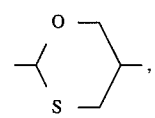
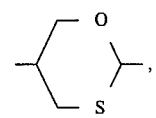
-continued
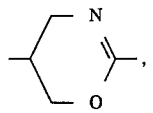
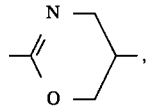
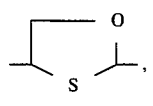
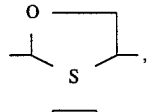
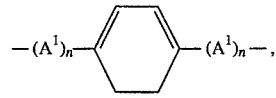
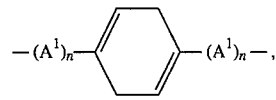
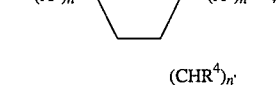
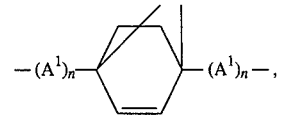
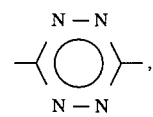
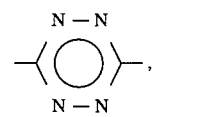

-continued

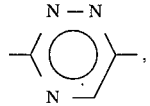

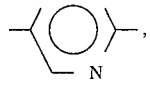

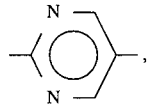

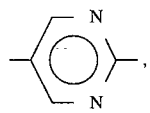

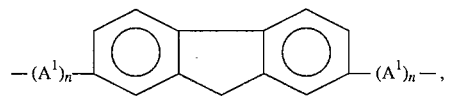

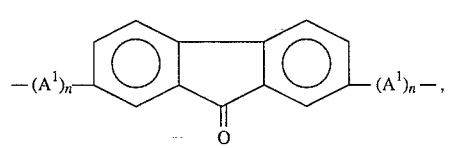

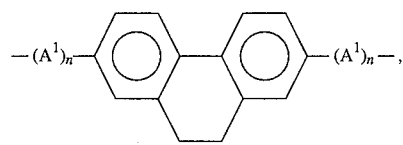

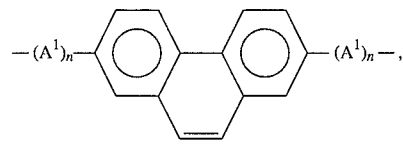

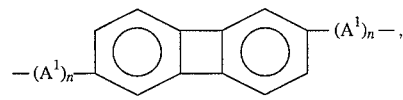

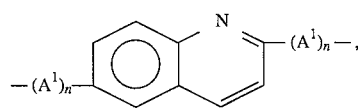

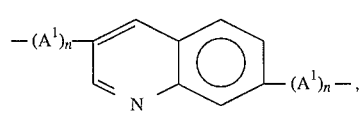

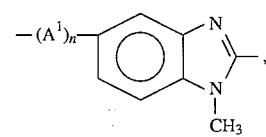

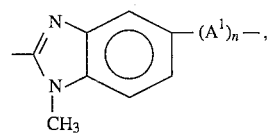

-continued

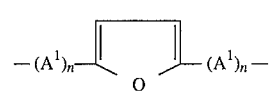

or

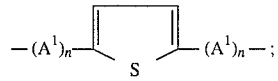

each $A^1$ is independently a —CO—, —O—CO—, —CO—O—, —CO—S— —S—CO—, —CO—NR$^2$— or —NR$^2$—CO— group; each R is independently hydrogen or a hydrocarbyl or hydrocarbyloxy group having from one to about 10, preferably one to about 4, carbon atoms, a halogen atom, preferably chlorine, bromine or fluorine, a nitro group, a nitrile group or a —CO—R$^2$ group; each $R^2$ is independently hydrogen or a hydrocarbyl group having from one to about 6, preferably from one to about 4, more preferably from one to about 2, carbon atoms, and is most preferably hydrogen or a methyl group; each $R^4$ is independently hydrogen or a hydrocarbyl group having from one to about 3 carbon atoms; n has a value of zero or 1; n' has a value of 1 or 2; each A' is independently a divalent hydrocarbyl group having from one to about 10, preferably from 1 to about 6, more preferably from one to about 2, carbon atoms; A" is a divalent hydrocarbyl group having from one to about 6, preferably from one to about 4, more preferably from one to about 2, carbon atoms; each $R^5$ is independently hydrogen, a hydrocarbyl group having from one to about 10, preferably from one to about 6, more preferably from one to about 3, carbon atoms or a halogen atom, preferably chlorine or bromine; each $R^6$ is independently hydrogen or a hydrocarbyl or halohydrocarbyl group having from one to about 6, preferably from 1 to about 4, more preferably from one to about 2 carbon atoms; Q is a direct bond, —CH$_2$—S—CH$_2$—, —(CH$_2$)$_{n''}$—, or

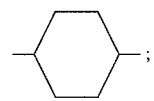

each $R^7$ is independently a hydrocarbyl group having from 1 to about 10, preferably from 1 to about 6, more preferably from 1 to about 2, carbon atoms or a

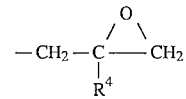

or

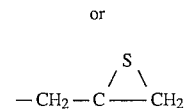

group; m has a value from about 0.001 to about 6, preferably from about 0.01 to about 3; m' has a value from one to about 10, preferably from one to about 4; p has a value from zero to about 30, preferably from zero to about 5 and p$^1$ has a value of from one to about 30, preferably from one to about 3. The aromatic rings in Formulas I, II, III, IV, V, VI, VIII, IX and X can also contain one or more heteroatoms selected from N, O, and S. The term "hydrocarbyl", when applied to the A" group of Formula VI can also include one or more heteroatoms selected from N, O and S. Thus, A" can be, for example, the —CO— or —CH₂—O—CH₂— group.

Mesogenic epoxy or thiirane resins include those represented by above Formulas II, V, VI, IX, and X wherein each A is independently selected from the aforementioned listing, but with the proviso that A can not be a divalent hydrocarbyl group having from one to 20 carbon atoms, —O—, —CO—, —SO—, —SO₂—, —S—, —S—S— and with the proviso that at least 80 percent of the molecules are para substituted by the bridging groups (—A—) in Formulas II, V, IX, X and by the direct bond in Formula VI, the substituent containing the glycidyl,

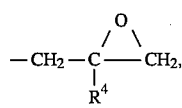

or thiirane,

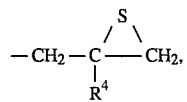

group(s), and the substituent containing the secondary hydroxyalkylidene, —CH₂—C(OH) (R⁴)—CH₂—, or thioalkylidene, —CH₂—C(SH)(R⁴)—CH₂—, group(s) which are present when p in Formulas II, V, VI and IX has a value greater than zero.

Representative epoxy resins include, for example, the diglycidyl ethers of: resorcinol, hydroquinone, 4,4'-isopropylidenediphenol (bisphenol A), 4,4'-dihydroxydiphenylmethane (bisphenol F), 4,4'-dihydroxybenzophenone, 3,3'5,5'-tetrabromo-4,4'-isopropylidenediphenol, 4,4'-thiodiphenol, 4,4'-sulfonyldiphenol, 4,4'-dihydroxydiphenyl oxide, 1,1-bis(4-hydroxyphenyl)-1-phenylethane, 3,3',5,5'-tetrachloro-4,4'-isopropylidenediphenol A, 3,3'-dimethoxy-4,4'-isopropylidenediphenol, 4,4'-dihydroxy-alpha-methylstilbene, 4,4'-(2-hydroxyethyloxy)-alpha-methylstilbene, 4,4'-dihydroxybenzanilide, 4,4'-dihydroxyazoxybenzene, 4,4'-dihydroxybiphenyl, 4,4'-dihydroxydiphenylazomethine, 4,4'-dihydroxydiphenylacetylene, 4,4'-dihydroxystilbene, 4,4'-dihydroxy-alpha-cyanostilbene, 4,4'-dihydroxyazobenzene, 4,4'-dihydroxyazoxybenzene, 4,4'-dihydroxychalcone, 4-hydroxyphenyl-4-hydroxybenzoate, dipropylene glycol, poly(propylene glycol), thiodiglycol; the triglycidyl ether of tris(hydroxyphenyl)methane; the polyglycidyl ethers of a phenol or alkyl or halogen substituted phenol-aldehyde acid catalyzed condensation product (novolac resins); the polyglycidyl amines of: 4,4'-diaminodiphenylmethane, 4,4'-diaminostilbene, N,N'-dimethyl-4,4'-diaminostilbene, 4,4'-diaminobenzanilide, 4,4'-diaminobiphenyl, 4,4'-diamino-alpha-methylstilbene; the polyglycidyl ether of the condensation product of a dicyclopentadiene or an oligomer thereof and a phenol or alkyl or halogen substituted phenol; the advancement reaction products of the aforesaid di and polyglycidyl ethers with aromatic di and polyhydroxyl or carboxylic acid containing compounds including, for example, hydroquinone, resorcinol, catechol, 2,4-dimethylresorcinol, 4-chlororesorcinol, tetramethylhydroquinone, 4,4'-isopropylidenediphenol (bisphenol A), 4,4'-dihydroxydiphenylmethane, 4,4'-thiodiphenol, 4,4'-sulfonyldiphenol, 2,2'-sulfonyldiphenol, 4,4'-dihydroxydiphenyl oxide, 4,4'-dihydroxybenzophenone, 1,1-bis(4-hydroxyphenyl)-1-phenylethane, 4,4'-bis(4(4-hydroxyphenoxy)phenylsulfone)diphenyl ether, 4,4'-dihydroxydiphenyl disulfide, 3,3',3,5'-tetrachloro-4,4'-isopropylidenediPhenol, 3,3',3,5'-tetrabromo-4,4'-isopropylidenediphenol, 3,3'-dimethoxy-4,4'-isopropylidenediphenol, 4,4'-dihydroxybiphenyl, 4,4'-dihydroxy-alphamethylstilbene, 4,4'-dihydroxybenzanilide, bis(4-hydroxyphenyl)terephthalate, N,N'-bis(4-hydroxyphenyl)terephthalamide, bis(4'-hydroxybiphenyl)terephthalate, 4,4'-dihydroxyphenylbenzoate, bis(4'-hydroxyphenyl)-1,4-benzenediimine; 1,1'-bis(4-hydroxyphenyl)cyclohexane, phloroglucinol, pyrogallol, 2,2',5,5'-tetrahydroxydiphenyl sulfone, tris(hydroxyphenyl)methane, dicyclopentadiene diphenol, tricyclopentadiene diphenol, terephthalic acid, isophthalic acid, 4,4'-benzanilidedicarboxylic acid, 4,4'-phenylbenzoatedicarboxylic acid, 4,4'-stilbenedicarboxylic acid, adipic acid; or any combination of the aforementioned epoxy resins.

Advancement reaction of di- and polyglycidyl ethers or di- and polythiirane ethers can be performed by the known methods which usually includes combining one or more suitable compounds having an average of more than one active hydrogen atom per molecule, including, for example, dihydroxy aromatic, dithiol or dicarboxylic acid compounds or compounds containing one primary amine or amide group or two secondary amine groups and the di- or polyglycidyl ethers in the presence or absence of a suitable solvent with the application of heat and mixing to effect the advancement reaction. The epoxy resin and the compound having more than one active hydrogen atom per molecule are reacted in amounts which provide suitably from about 0.01:1 to about 0.95:1, more suitably from about 0.05:1 to about 0.8:1, most suitably from about 0.10:1 to about 0.5:1 active hydrogen atoms per epoxy group. The advancement reaction can be conducted at atmospheric, superatmospheric or subatmospheric pressures at temperatures of from about 20° C. to about 260° C., more suitably from about 80° C. to about 240° C., most suitably from about 100° C. to about 200° C. The time required to complete the advancement reaction depends upon the temperature employed. Higher temperatures require shorter periods of time whereas lower temperatures require longer periods of time. Generally, times of from about 5 minutes to about 24 hours, more suitably from about 30 minutes to about 8 hours, most suitably from about 30 minutes to about 4 hours are employed. A catalyst, including, for example, phosphines, quaternary ammonium compounds, phosphonium compounds and tertiary amines, is frequently added to facilitate the advancement reaction and is usually employed in quantities of from about 0.01 to about 3, preferably from about 0.03 to about 1.5, most preferably from about 0.05 to about 1.5 percent by weight based upon the weight of the epoxy resin.

When the epoxy resin and the compound having more than one active hydrogen atom per molecule are reacted in an advancement reaction in amounts which provide suitably from about 0.096:1 to about 1.05:1 active hydrogen atoms per epoxy group, a relatively high molecular weight, substantially thermoplastic, resinous product is produced. When the compound having an average of more than one active hydrogen atom per molecule is a diphenol, the resultant resinous product is a phenoxy-type resin. If desired, the reaction can be conducted in the presence of a suitable catalyst such as, for example, those catalysts described herein for use in the advancement reaction. These thermoplastic resin compositions contain little, if any, curable epoxide functionality and can even contain active hydrogen functionality, depending upon which component is employed in excess, the epoxy resin or the active hydrogen containing compound. It is also operable to react out any terminal residual epoxide groups with a monofunctional active hydrogen containing compound, such as, for example, carboxylic acids, phenols, thiols, secondary amines, or mixtures thereof.

According to the teachings found in *Encyclopedia of Polymer Science and Engineering*, vol. 6, page 331, published by John Wiley and Sons, New York, New York (1986), which is incorporated herein by reference, aside from the aforementioned advancement method, a phenoxy resin can also be prepared by reaction of a 1:1 mole ratio of high purity bisphenol A and epichlorohydrin. It is likewise operable to prepare phenoxy resins containing one or more rodlike mesogenic moieties via reaction of one or more diphenols containing one or more rodlike mesogenic moieties with one or more epihalohydrins.

CURING AGENTS

Suitable curing agents which can be used to prepare the curable compositions used in the present invention include, for example, aliphatic, cycloaliphatic, polycycloaliphatic or aromatic primary monoamines; aliphatic, cycloaliphatic, polycycloaliphatic or aromatic primary and secondary polyamines; carboxylic acids and anhydrides thereof; aromatic hydroxyl containing compounds; imidazoles; guanidines; ureaaldehyde resins; melamine-aldehyde resins; alkoxylated urea-aldehyde resins; alkoxylated melamine-aldehyde resins; amidoamines; epoxy resin adducts all, none, or a part of which can contain one or more mesogenic moieties; combinations thereof and the like. Particularly suitable curing agents which do not contain mesogenic moieties include, for example, methylenedianiline, dicyandiamide, ethylene diamine, diethylenetriamine, triethylenetetramine, tetraethylenepentamine, urea-formaldehyde resins, melamine-formaldehyde resins, methylolated urea-formaldehyde resins, methylolated melamine-formaldehyde resins, phenol-formaldehyde novolac resins, cresol-formaldehyde novolac resins, sulfanilamide, diaminodiphenylsulfone, diethyltoluenediamine, t-butyltoluenediamine, bis-4-aminocyclohexylamine, isophoronediamine, diaminocyclohexane, hexamethylenediamine, piperazine, aminoethylpiperazine, 2,5-dimethyl-2,5-hexanediamine, 1,12-dodecanediamine, tris-3-aminopropylamine, combinations thereof and the like. Particularly suitable curing agents which contain mesogenic moieties include, for example, 4,4'-diamino-stilbene, 4,4'-diamino-alpha-methylstilbene, 4,4'-diaminobenzanilide, 4,4'-bis(aminophenoxy)-alpha-methylstilbene, 4,4'-dihydroxy-alpha-methylstilbene, 4,4'-dihydroxy-alpha-cyanostilbene, 4,4'-dihydroxy-stilbene, 4,4'-dihydroxy-2,2'-dimethylazoxybenzene, 4,4'-dihydoxy-a,a'-diethylstilbene, 4,4'-dihydroxybenzanilide, 4,4'-dihydroxybiphenyl-benzoate, bis(4-hydroxyphenyl)terephthalate, bis(N,N'-4-hydroxyphenyl)terephthalamide, bis(4'-dihydroxybiphenyl)terephthalate, 4,4'-dihydroxyphenylbenzoate, 1,4-bis(4'-hydroxyphenyl-1'-carboxamide)benzene, 1,4bis(4'-hydroxyphenyl-1'-carboxy)benzene, 4,4'-bis(4"-hydroxyphenyl-1"-carboxy)biphenyl, bis(4'-hydroxyphenyl)-1,4-benzenediimine, 4,4'-benzanilidedicarboxylic acid, 4,4'-phenylbenzoatedicarboxylic acid, 4,4'-stilbenedicarboxylic acid, or any combination thereof and the like.

CURING CATALYSTS

Curing catalysts can be employed, if desired, to enhance the cure between the epoxy or thiirane resin(s) and the curing agent(s). Particularly suitable curing catalysts include boron trifluoride, boron trifluoride etherate, aluminum chloride, ferric chloride, zinc chloride, silicon tetrachloride, stannic chloride, titanium tetrachloride, antimony trichloride, boron trifluoride monoethanolamine complex, boron trifluoride triethanolamine complex, boron trifluoride piperidine complex, pyridine-borane complex, diethanolamine borate, zinc fluoroborate, mixtures thereof and the like.

Particularly suitable latent curing catalysts include those disclosed in U.S. Pat. Nos. 4,594,291; 4,725,652; 4,925,901; 4,946,817; 5,134,239; 5,140,079 and 5,169,473, all of which are incorporated herein by reference. Of these latent catalysts, particularly suitable are those prepared by reacting an onium or amine compound with an acid having a weak-nucleophilic anion. Such latent catalysts include, for example, tetrabutyl phosphonium tetrahaloborates, benzyltrimethylammonium tetrahaloborates, tetrabutylammonium tetrahaloborates, triethylamine.tetrahaloboric acid complexes, tributylamine.tetrahaloboric acid complexes, N,N'-dimethyl-1,2-diaminoethane.tetrahaloboric acid complexes, mixtures thereof and the like.

The curing catalysts are employed in amounts which will effectively cure the curable composition, however, these amounts will depend upon the particular curing agent employed and the epoxy or thiirane resin employed. Generally suitable amounts include, for example, 0.001 to about 2 percent by weight of the total epoxy or thiirane resin used. It is frequently of benefit to employ one or more of the curing catalysts in the curing of the curable compositions used in the preparation of the mesogen containing biaxially oriented film compositions of the present invention. This is generally done to accelerate or otherwise modify the curing behavior obtained when a curing catalyst is not used.

CURABLE COMPOSITIONS

The curable compositions used to prepare the mesogen containing biaxially oriented film compositions of the present invention can employ any known epoxy or thiirane resin and epoxy resin curing agent and/or curing catalyst. The epoxy or thiirane resin can contain one or more rodlike mesogenic moieties, the epoxy resin curing agent can contain one or more rodlike mesogenic moieties or both the epoxy or thiirane resin and the epoxy resin curing agent can contain one or more rodlike mesogenic moieties. The curing agents and curing catalysts can be employed alone or in combination as described in *Handbook of Epoxy Resins* by Lee and Neville, McGraw-Hill, 1967 which is incorporated herein by reference in its entirety.

The curable compositions used to prepare the biaxially oriented film compositions of the present invention are prepared by mixing together one or more curing agents and/or curing catalysts with one or more epoxy or thiirane resins. For epoxy resins and/or curing agents which are solids, it is frequently convenient to first melt the epoxy resin, then dissolve the curing agent therein. It is also operable to melt the curing agent then dissolve the epoxy resin therein, although this is generally less preferred. Mixing of the aforesaid components can be performed using any such equipment designed for that purpose and includes, for example, mixing in an extruder. Other suitable mixing devices include, for example, torque rheometers, mechanical blenders, ultrasonic mixers, stirred reactors, static mixers, and the like.

The curing agents are employed in amounts which will effectively cure the curable mixture, with the understanding that these amounts will depend upon the particular curing agent(s) and epoxy or thiirane resin(s) employed. Generally, suitable amounts are from about 0.80:1 to about 1.50:1, preferably from about 0.95:1 to about 1.05:1 equivalents hydrogen reactive with an epoxide group per equivalent of epoxide or thiirane group in the epoxy resin at the conditions employed for curing. The aforementioned phenoxy-type thermoplastics represent compositions which may be preformed into a thermoplastic and used to prepare biaxially oriented films of the present invention or may exist as curable compositions used to prepare biaxially oriented films of the present invention. In the latter case, curing eventually provides the phenoxy-type resin in situation.

BIAXIAL ORIENTED FILM PREPARATION

In a preferred process used to prepare the biaxially oriented films of the present invention, the mesogen containing curable composition is processed to form a relatively thick plaque or sheet. The optimum thickness is such that stretching to induce biaxial orientation can be done as desired without inducing flaws or even tearing in the resultant film. Furthermore, the optimum thickness varies depending upon the composition and extent of cure, if any, of the curable mixture, the desired thickness of the final film product, the amount of stretching to be performed, and other such variables. Typical thicknesses for said plaques or sheets preferably range from a minimum of 1 mil (0.00254 cm) to a maximum of about 250 mil (635 cm). The plaque or sheet formation is done using methods and equipment suitable for preparing such plaques or sheets, such as, for example, compression molding of the curable composition in a frame of the desired thickness or casting of the curable composition in a mold of the desired thickness or extrusion through a die. The extrusion can optionally be through a slit die, such as a coathanger die or T-die, or through a tubular die, such as a counter-rotating die. An example of extrusion techniques is given by the aforementioned *Plastics Extrusion Technology* reference and by Chris Rauwendaal, *Polymer Extrusion*, Hanser Publishers, New York, New York, (1986) which are both incorporated herein by reference. It is preferred that the processing to produce the plaque or sheet does not induce discrete layers with different orientations in said plaque or sheet. Thus, the extrusion die preferably does not contain opposing surfaces that move in relation to each other during extrusion to orient different layers of the plaque or sheet in different discrete directions. Specifically, the die should not subject the faces of the plaque or sheet to shear forces transverse to the machine direction during extrusion. In this manner, the possibility of delamination of the plaque or sheet due to the presence of layers with molecules oriented in different directions is minimized.

A film can also be produced from an extruded tube of molten curable or B-staged mixture via inflation of said tube to produced a bubble of the desired diameter or film thickness. The tubular film produced from this blown film technique is opened to provide a flat sheet or film suitable for use in a biaxial orientation process.

For the curable mixtures and the B-staged curable mixtures used to prepare the biaxially oriented films of the present invention, it is frequently desirable to extrude the plaque or sheet between two layers of a stretchable polymer film which is inert with respect to the plaque or sheet under the process conditions. Examples of suitable polymer film include Teflon® fluorocarbon film and amorphous polyester film. These outer layers prevent adhesion of the plaque or sheet to processing surfaces or itself or other objects after extrusion. This is especially preferred when curable biaxially oriented films to be used in the preparation of laminate or composite products, adhesives or coatings are prepared.

The resulting plaque or sheet is mechanically stretched in at least the direction transverse to the machine direction. A mechanical device grips the transverse edges of the plaque or sheet and pulls the transverse edges apart. The plaque or sheet can also be stretched in the machine direction and/or in any other direction. If stretching in multiple directions is performed, then the stretching can be in a single direction at a time or can be simultaneous in two or more directions. If the process for preparing the plaque or sheet produces little, if any orientation in a machine direction or only produces random orientation, such as, for example, when compression molding of the curable composition in a frame of the desired thickness is used, stretching in one direction followed by stretching in a direction perpendicular or approximately perpendicular to the initial direction of stretching is desirable for inducing biaxial orientation.

Individual plaques or sheets of the curable compositions used to prepare the biaxially oriented films of the present invention can be stretched in a batch fashion using commercially available equipment such as the T. M. Long™ Film Stretcher, available from T. M. Long Co. Mechanical stretching can also be performed on a tentering device, which continuously stretches a continuous plaque or sheet.

The plaque or sheet is tentered in a manner similar to that used for known thermoplastic polymers. Typically, the plaque or sheet travels continuously through a tentering device. Near the front of the device, gripping means, such as clips, grip the transverse edges of the plaque or sheet. As the plaque or sheet travels through the tentering device, the gripping means move further apart, drawing the transverse edges of the plaque or sheet further apart. The tentering device can have zones in which no stretching occurs before and/or after the stretching zone. Examples of tentering equipment are described in numerous references, such as by Young in U.S. Pat. No. 2,473,404; Minich in U.S. Pat. No. 2,334,022; Milne in U.S. Pat. No. 2,618,012; Tomlinson in U.S. Pat. No. 3,571, 846; Levy et al., in U.S. Pat. No. 4,104,769; Kwack in U.S. Pat. No. 4,862,564. Tentering devices are also commercially available from companies such as Marshall and Williams Co., Bruckner Machinery Corp. and Crown Products.

Some tentering machines are known which can simultaneously stretch a plaque or sheet in the machine direction and in the direction transverse to the machine direction. Alternatively, equipment that stretches a plaque or sheet in the machine direction, such as a series of rollers moving at different speeds, can be placed on the film line before or after the tentering apparatus.

Stretching should be carried out at a temperature and at a rate at which the plaque or sheet can stretch without tearing. The temperature of stretching is preferably not less than about 10° to 20° C. below the glass transition temperature, and is more preferably at least the glass transition temperature. The maximum temperature of stretching should be low enough that the film is stable. It is preferably low enough to minimize sagging of the plaque or sheet during stretching. The temperature of stretching is preferably no more than 150° to 175° C. above the glass transition temperature, more preferably no more than 100 ° to 125° C. above the glass transition temperature. The optimal rate of stretching varies widely depending upon a number of variables such as, for example, composition of the curable mixture, temperature, and the like and is best determined by simple preliminary experiment.

The previously described steps of forming a plaque or sheet, for example, via extrusion, and tentering said plaque or sheet, can be integrated into a single continuous process in which the curable blend is extruded into a plaque or sheet and passed into a tentering machine. The continuous process might optionally further contain an apparatus to stretch the plaque or sheet in the machine direction before or after tentering. Alternatively, one of the steps can be broken away from the other. For example, the extruded film can be taken up on a roll and stored until ready for tentering.

Two or more layers of tentered film can be pressed together to form a thicker film. Reinforcing fibers can be pressed into a tentered film to form a prepreg. Known coextrusion techniques can be applied for producing multilayered plaques, sheets or films wherein at least one layer comprises the composition described above.

One reason that mechanical stretching is advantageous for preparation of the biaxially oriented films of the present invention is that the degree of stretch in each direction can be easily selected. For example, the film can be stretched in the direction transverse to the machine direction with essentially no stretch in the machine direction. Alternatively, the film can be stretched in the machine direction and direction transverse to the machine direction in almost any ratio that the film and equipment will permit, from essentially equal to much greater stretch in the machine or transverse to the machine directions. Because mechanical stretching permits a wide variety in the degree and type of stretching, the biaxially oriented films made using the mechanical stretching can have a wide variety of mechanical properties. For example, the tensile modulus in the machine and transverse to the machine directions can be at least about as high in the transverse to the machine direction as is in the machine direction, thus providing a balance of properties. Alternatively, the tensile modulus can be substantially higher in either the machine or transverse to the machine direction in a film with purposely unbalanced properties.

CURING

Curing of the curable compositions used in the present invention can be conducted at atmospheric, superatmospheric or subatmospheric pressures at temperatures of from about 0° C. to about 300° C., preferably from about 50° C. to about 240° C., more preferably from about 150° C. to about 220° C. The time required to complete curing depends upon the individual components in the curable composition and the temperature employed. Higher temperatures require shorter periods of time whereas lower temperatures require longer periods of time. Generally, however, times of from about 15 minutes to about 48 hours, preferably from about 15 minutes to about 8 hours, more preferably from about 30 minutes to about 3 hours are suitable. The effect of temperature on the curing kinetics of the curable composition being biaxially oriented must be considered. In a preferred embodiment of the present invention, the mesogen containing biaxially oriented film is cured in situ immediately after stretching in the tentering device.

It is also operable to partially cure (B-stage) the curable compositions used in the present invention and then complete the curing at a later time. B-staging can be accomplished by heating at a temperature for such a time that only partial curing is produced. Usually, the cure temperatures are employed for B-staging, however, for a shorter period of time. Generally, the extent of B-staging is monitored using analytical methods such as viscosity measurement, differential scanning calorimetry for residual cure energy or infrared spectrophotometric analysis for unreacted curable functional groups.

It is frequently of value to "B-stage" the curable compositions used in the present invention in order to chain extend the resin. This chain extension is required for some mesogen containing curable compositions in order to achieve liquid crystal character. B-staging can also be employed to increase the temperature range at which a particular curable composition is liquid crystalline and to control the degree of crosslinking during the final curing stage. In the present invention, B-staging is required for some mesogen containing curable compositions in order to provide processability needed to induce biaxial orientation.

OTHER COMPONENTS

The curable compositions used to prepare the mesogen containing biaxially oriented films of the present invention can be blended with other materials such as, for example, solvents or diluents, fillers, pigments, dyes, flow modifiers, thickeners, reinforcing agents, mold release agents, wetting agents, stabilizers, fire retardant agents, surfactants, plasticizers or any combination thereof and the like.

These additives are added in functionally equivalent amounts, e.g., the pigments and/or dyes are added in quantities which will provide the composition with the desired color; however, they are suitably employed in amounts of from about zero to about 20, more suitably from about 0.5 to about 5, most suitably from about 0.5 to about 3 percent by weight based upon the weight of the total blended composition containing such additives.

Solvents or diluents which can be employed herein include, for example, hydrocarbons, ketones, glycol ethers, aliphatic ethers, cyclic ethers, esters, or any combination thereof and the like. Particularly suitable solvents or diluents include, for example, toluene, xylene, methylethylketone, methylisobutylketone, diethylene glycol methyl ether, dipropylene glycol methyl ether, tetrahydrofuran, dioxane, propylene glycol methyl ether or any combination thereof and the like.

The modifiers such as thickeners, flow modifiers and the like can be suitably employed in amounts of from zero to about 10, more suitably from about 0.5 to about 6, most suitably from about 0.5 to about 4 percent by weight based upon the weight of the total composition.

Reinforcing materials which can be employed herein include natural and synthetic fibers in the form of woven fabric, mats, monofilament, multifilament, unidirectional fibers, rovings, random fibers or filaments, inorganic fillers or whiskers, hollow spheres, and the like. Suitable reinforcing materials include glass, ceramics, nylon, rayon, cotton, aramid, graphite, polyalkylene terephthalates, polyethylene, polypropylene, polyesters or any combination thereof and the like.

Suitable fillers which can be employed herein include, for example, inorganic oxides, ceramic microspheres, plastic microspheres, glass microspheres, inorganic whiskers, calcium carbonate or any combination thereof and the like.

The fillers can be employed in amounts suitably from about zero to about 95, more suitably from about 10 to about 80, most suitably from about 40 to about 60 percent by weight based upon the weight of the total composition.

UTILIZATION

The mesogen-containing biaxially oriented films of the present invention can be employed in coating, encapsulation, electronic or structural laminate or composite, molding, adhesive and the like applications.

Laminate or composite products are prepared using one or more mesogen containing biaxially oriented curable or B-staged films of the present invention, for example by stacking together said films, then consolidating to the laminate or composite part by pressing together. Reinforcing fibers, mats or prepregs can be placed in the stack for inclusion in the consolidation process to produce the laminate or composite. Different types of curable films, for example non-oriented films of a curable mixture of an epoxy resin and curing agent therefore or films prepared by uniaxial orientation of a mesogen containing curable mixture of an epoxy resin and curing agent therefor, can be included in the stack as desired prior to the consolidation process.

Coatings are prepared using one or more mesogen containing biaxially oriented curable or B-staged films of the present invention, for example by placing said film over the surface to be coated, then pressing together under conditions suitable to fuse the film to the surface as a coating.

Adhesives are prepared using one or more mesogen containing biaxially oriented curable or B-staged films of the present invention, for example by placing said film between the two surfaces to be bonded, then pressing together under conditions suitable to form the adhesive bond.

The following Examples are for illustrative purposes only and are not to be construed as to limiting the scope of the invention in any manner.

EXAMPLE 1

A. Synthesis of 4,4'-Dihydroxy-alpha-methylstilbene

Phenol (752.88 grams, 8.0 moles), chloroacetone (383.7 grams, 4.0 moles as chloroacetone) and methylene chloride (600 grams) are added to a 5 liter glass reactor equipped with a chilled water condenser, mechanical stirrer, nitrogen purge (one liter per minute), thermometer, dropping funnel and jacket for circulating coolant over the reactor exterior. Stirring commences concurrent with cooling of the reactant solution to −12° C. The chloroacetone used is a commercial grade containing 96.45% chloroacetone, 3.0% 1,1-dichloroacetone, 0.50% mesityl oxide and 0.05% acetone. Concentrated sulfuric acid (392.3 grams, 4.0 moles) is added to the dropping funnel, then dropwise addition to the stirred reactant solution commences over a 65 minute period and so as to maintain the reaction temperature between −11° C. and −12° C. After 2.5 hours of post reaction at −12 deg. C. to −13° C., the viscous, orange colored product is mixed with chilled (4° C.) deionized water (600 milliliters). The organic layer is recovered and mixed with a second portion (600 milliliters) of chilled deionized water. The organic layer is recovered and divided equally into a pair of 2 liter glass beakers. The contents of each beaker is stirred, ethanol (200 milliliters) is added, followed by deionized water (250 milliliters) which induces a hazy appearance in the stirred mixture. Heating commences and as the temperature of the mixtures increases, clearing of the hazy appearance occurs. Each time clearing is observed, sufficient deionized water is added to induce cloudiness, followed by continuation of the heating and mixing. Once a temperature of 70° C. is achieved and substantially all of the methylene chloride solvent has boiled off, heating ceases and deionized water is added to each beaker in an amount sufficient to produce a total volume of 1.8 liters. A massive precipitation of white crystalline plates occurs followed by immediate coalescence of the precipitated product to an oil. The oil layers are recovered by decantation to remove the aqueous layers and ethanol (250 milliliters) is added top each of the beakers. Deionized water is again added to the stirred solutions as heating commences in an amount sufficient to induce cloudiness each time clearing occurs. Once a temperature of 70° C. is achieved, a massive precipitation of white crystalline plates results as water is added to each beaker in an amount sufficient to produce a total volume of 1.8 liters. At this time, stirring is stopped and the crystalline slurry is chilled to 4° C. and held therein for 16 hours. The crystalline product is recovered via filtration of the chilled crystalline slurry then added to a glass beaker and combined therein with deionized water (one liter). Stirring and heating commence until the stirred slurry reaches 90° C. After 15 minutes at 90° C., the stirred slurry is filtered while hot through a fritted glass filter. The product recovered from the filter is dried in a vacuum oven at 80° C. under a one mm Hg vacuum to a constant weight of 378.32 grams of pink colored crystalline product. Proton magnetic resonance spectroscopy, Fourier transform infrared spectrophotometric analysis and high pressure liquid chromatography-mass spectrometry confirm the product structure. A replicate of the aforementioned reaction is completed and provides an additional 355.75 grams of 4,4'-dihydroxy-alpha-methylstilbene.

B. Synthesis of 4,4'-Diglycidyloxy-alpha-methylstilbene 4,4'-Dihydroxy-alpha-methylstilbene (452.5 grams, 4.0 hydroxyl equivalents) from A above, epichlorohydrin (1850.6 grams, 20.0 moles), deionized water (160.9 grams, 8.0 percent by weight of the epichlorohydrin used) and isopropanol (996.5 grams, 35 percent by weight of the epichlorohydrin used) are added to a reactor and heated to 50° C. with stirring under a nitrogen atmosphere. Once the 50° C. temperature is achieved, sodium hydroxide (144.0 grams, 3.60 moles) dissolved in deionized water (576.0 grams) is added dropwise to the reactor over a 45 minute period and so as to maintain the reaction temperature between 50° and 61° C. Ten minutes after completion of the aqueous sodium hydroxide addition, the stirring is stopped and the aqueous layer which separates from the reaction mixture is pipetted off and discarded. Stirring is resumed and after a total of 20 minutes following the completion of the initial aqueous sodium hydroxide addition, a second solution of aqueous sodium hydroxide (64.0 grams, 1.60 mole) dissolved in deionized water (256.0 grams) is added to the reactor over a 20 minute period with maintenance of the reaction temperature between 50° and 51° C. Fifteen minutes after completion of the aqueous sodium hydroxide, the recovered reaction mixture is added to a separatory funnel and washed with warm (60° to 70° C.) deionized water (1200 milliliters). The separated organic layer is washed a second time (1200 milliliters of warm deionized water), recovered and then rotary evaporated under vacuum using final conditions of 150° C. and one mm Hg vacuum for 2 hours. After removal from the rotary evaporator, the molten epoxy resin is vacuum filtered through a heated (175° C.) medium fritted glass funnel, then poured into an aluminum foil tray to solidify. The 4,4'-diglycidyloxy-alpha-methylstilbene is recovered (645.4 grams) as a crystalline white solid. Titration of portions of the diglycidyl ether product reveals an epoxide equivalent weight (EEW) of 181.15. Analysis of a portion of the diglycidyl ether product via microscopy under crosspolarized light is completed at 70× magnification using a microscope equipped with a programmable hot stage using a heating rate of 10° C. per minute and a range of 30° to 150° C., immediately followed by cooling. Isotropization is observed at 131° C., liquid crystallinity occurs at 92° C. and crystallization occurs at 55° C. The diglycidyl ether is a monotropic liquid crystal with a nematic texture.

C. Preparation of Aniline Adduct of 4,4'-Diglycidyloxy-alphamethylstilbene

Aniline (2793.5 grams, 30.0 moles) is added to a reactor equipped with a chilled glycol condenser (5° C.), mechanical stirrer, nitrogen purge (one liter per minute), thermometer, heating mantle and temperature controller. Stirring commences concurrent with heating to 90° C., followed by addition of solid 4,4'-diglycidyloxy-alpha-methylstilbene (541.6 grams, 3.0 epoxide equivalent) from B above at a rate of 11.28 grams every 10 minutes while maintaining the 90° C. reaction temperature. After completion of the addition of 4,4'-diglycidyloxy-alpha-methylstilbene, the reactor is maintained at 90° C. for the next 16 hours. At the end of the 16 hour post reaction, the solution is recovered and rotary evaporated under vacuum for one hour at 90° C., then 4 hours at 150° C. under 2 mm Hg vacuum. The product is recovered (811.6 grams) as a light amber colored, transparent solid at 25° C. Fourier transform infrared spectrophotometric analysis of a film sample of the product on a sodium chloride plate demonstrates that complete conversion of the epoxide groups has occurred. Titration of a portion of the product for total nitrogen content demonstrates the presence of 3.553 milliequivalents of nitrogen per gram of product. Titration of a portion of the product which had been acetylated via reaction with acetic anhydride for tertiary nitrogen content demonstrates the presence of 0.0601 milliequivalents of tertiary nitrogen per gram of product. By difference, the total secondary amine content is calculated to be 3.4929 milliequivalents >N—H per gram of product.

D. Preparation of B-staged Resin From 4,4'-Diglycidyloxy-alpha-methylstilbene and the Aniline Adduct of 4,4'-Diglycidyloxy-alphamethylstilbene A portion (35.95 grams, 0.205 epoxide equivalent) of 4,4'-diglycidyloxy-alpha-methylstilbene prepared using the method of B above and recrystallized from acetone (175.55 EEW) is placed in a forced air, convection type oven and heated to 150° C. Forty minutes later, the 4,4'-diglycidyloxy-alpha-methylstilbene is fully melted and the oven temperature is decreased to 120° C. At this time, a portion (58.64 grams. 0.205 >N—H equivalent) of the aniline adduct of 4,4'-diglycidyloxy-alpha-methylstilbene from C above is placed in the oven. After forty minutes, the 4,4'-diglycidyloxy-alphamethylstilbene and the aniline adduct of 4,4'-diglycidyloxy-alphamethylstilbene equilibrated to 120° C. are combined and stirred for five minutes while maintained in the 120° C. oven. At the end of this time, the resin blend is removed from the oven, degassed for one minute in a vacuum bell jar, then placed in a forced air, convection type oven which is preheated to 80° C. While in the 80° C. oven, the resin blend is stirred every four to five minutes. After 23 minutes, the resin blend is removed from the oven and cooled to room temperature (24° C.). During the B-staging at 80° C., the resin blend turned from a translucent melt to an opaque, semi-solid from which fibers could be drawn with a cold spatula. The cooling of the B-staged resin blend to room temperature provides a solid. Differential scanning calorimetry on a portion (21.3 milligrams) of the solid resin blend is performed at a heating rate of 10° C. under a stream of nitrogen flowing at 35 cubic centimeters per minute. This analysis reveals a glass transition temperature of 55° C. and a cure exotherm with an onset temperature of 80° C.

E. Preparation of a Biaxially Oriented Film From the B-staged Resin of 4,4'-Diglycidyloxy-alpha-methylstilbene and the Aniline Adduct of 4,4'-Diglycidyloxy-alpha-methylstilbene The B-staged resin prepared from the 4,4'-diglycidyloxy-alpha-methylstilbene and the aniline adduct of 4,4'-diglycidyloxy-alpha-methylstilbene in D above is broken into coarse chunks then ground in a mortar and pestle to a fine powder. The resin powder is sieved through a 60 mesh screen and the recovered powder added to a rectangular 3.5 inch by 3.5 inch by 1/16 inch (8.89 cm x 8.89 cm x 0.15875 cm) stainless steel mold which has been pretreated with a Teflon™ fluoropolymer mold release. The powder filled mold is then placed into a hydraulic press which has been preheated to 100° C. and subjected to 10 tons (9,072 kg) of pressure for 5 minutes. After this time, the mold is removed from the press, and the temperature of the press is reduced to 80° C. Once the press is at thermal equilibrium, the mold is placed into the press for an additional 13 minutes. After this time, the mold is removed from the press and the resin plaque recovered from the mold and then framed with one inch wide strips of 0.002 inch thick skived Teflon™ fluorocarbon film to prevent sticking of the resin to the stretcher jaws. The resultant Teflon™ framed resin plaque is then placed into an Iwamoto Seisakusho Biaxial Stretcher, model BIX-703, maintained at 110° C. After one minute, the forced convection heater is stopped. The resin plaque is then biaxially stretched (in the x and y directions) by a factor of 3 at 3 mm per second. The resultant biaxially oriented film is then cured in the stretcher while under constraint, using the following sequential schedule: 4 hours at 80° C., one hour at 90° C., one hour at 100° C. and 4 hours at 110° C. The film recovered from the stretcher is shiney and metallic in appearance with a thickness of 0.0047 inch. The reflectivity of the film under front lighting conditions is uniform at all angles of incidence. The film is translucent under back lighting conditions. The tensile properties are determined via testing on an Instron machine using standard method ASTM D 638-89 Type V test pieces, (sample rate=10.00 data points/sec.; crosshead speed=0.200 in./min. (5.08 cm/min, humidity= 50%; temperature=72° F. (22.2° C.); six test specimens per test) and are reported in Table I.

TABLE I

| PROPERTY | VALUE |
| --- | --- |
| Tensile Strength: | |
| x-direction, psi | $17.2 \times 10^3$ |
| x-direction, Pa | $118,589.8 \times 10^3$ |
| y-direction, psi | $20.0 \times 10^3$ |
| y-direction, Pa | $137,895.1 \times 10^3$ |
| Tensile Elongation: | |
| x-direction, % | 2.6 |
| y-direction, % | 6.3 |
| Tensile Modulus: | |
| x-direction, psi | $883 \times 10^3$ |
| x-direction, Pa | $6,088,070 \times 10^3$ |
| y-direction, psi | $865 \times 10^3$ |
| y-direction, Pa | $5,963,965 \times 10^3$ |

F. X-Ray Diffraction Analysis of Biaxially Oriented Film From the B-staged Resin of 4,4'-Diglycidyloxy-alpha-methylstilbene and the Aniline Adduct of 4,4'-Diglycidyloxy-alpha-methylstilbene Small angle X-ray (SAX) and wide angle X-ray (WAX) diffraction studies are carried out on the biaxially drawn film from E above. Multiple sections of biaxially oriented films prepared from the B-staged resin of 4,4'-diglycidyloxy-alpha-methylstilbene and the aniline adduct of 4,4'-diglycidyloxy-alpha-methylstilbene are aligned in a stack and used for xy, xz and yz sample plane orientations. This is done to provide sufficient diffraction intensity. A pinhole camera He purged collimation system is used for all X-ray experiments. A Rigaku RU-200 rotating copper anode X-ray generator set at 50 kV and 170 mA provided the source. Copper $K_\alpha$ X-rays, with wavelength of 1.54 angstroms, are filtered by a 0.0001 inch thick Ni foil located between the shutter and first slit assembly. The adjustable slit configuration for X-ray collimation is bottom or first slit assembly, one mm by one mm, and top or second slit assembly, 0.7 mm by 0.7 mm, respectively. The distance between slits is 660 mm and the sample replacement is after the second slit assembly. Double emulsion Kodak DEF5 film is used for detection and Kodak GBX developer for development. Distances from incident sample plane to the the film detection plane were 50 mm and 250 mm for WAX and SAX, respectively.

When the film plane xy of the biaxially drawn film sample is perpendicular to the incident X-ray beam, the WAX flat film diffractogram exhibits a sharp full inner ring reflection and a diffuse outer ring reflection which has significantly greater intensity about the equator. When the film is sectioned and aligned so that its xz plane is perpendicular to the incident X-ray beam and its x direction along the Ewald sphere equatorial plane, the inner reflection has sharp high intensity arcs about the equator with small intense lobes at the poles, while the diffuse outer reflection has strongest intensity concentrated in the meridian region. The intensity of the latter reflection decreases quickly as a function of the angle to negligible intensity about the equator. When the film is sectioned and aligned so that the yz plane is perpendicular to the incident X-ray beam and its y direction along the Ewald sphere equatorial plane, the inner and outer reflections exhibit the same intensity distributions as for the xz alignment. The WAX diffractogram outer reflections correspond to about 4.6 angstroms d spacing.

The SAX flat film diffractogram for the yz and zx alignments exhibited sharp arcs about the equator indicative of the overall liquid crystalline director axis alignment.

In non-oriented films prepared from the B-staged resin of 4,4'-diglycidyloxy-alpha-methylstilbene and the aniline adduct of 4,4'-diglycidyloxy-alpha-methylstilbene, liquid crystalline domains are randomly distributed in space. The resulting WAX and SAX diffractograms exhibit rings of constant azimuthal intensity. This type of scattering occurs because the following contributions are equal in magnitude: If the x direction is in the equatorial plane and the y direction is in the meridinal plane, then domains with directors aligned along radii parallel to the y direction contribute to scattering in the meridian of the diffraction pattern, while domains with directors aligned along radii parallel to the x direction will contribute to scattering in the equator of the diffraction pattern. Domains with directors aligned along intermediate radii will cause scattering at intermediate azimuthal values. Thus, when the polymeric liquid crystalline domains have a net molecular orientation the direction of this orientation will determine the location of increased azimuthal intensity in the resulting diffraction pattern.

In the present example, when the sample film plane is aligned such that either its x or y draw axis is along the equator the SAX reflections are sharp arcs located about the equator. This indicates that the liquid crystal domains in the biaxially drawn film are oriented in the draw directions. When the sample film is aligned such that its x draw axis is along the equator and its y draw axis along the meridian, the inner reflection of the WAX diffractogram had a constant azimuthal intensity. This indicates that the net liquid crystal director orientation of these domains is similar in both the x and y draw directions and that it covers a range of about +/−45 deg. For chain extension of 4,4'-diglycidyloxy-alpha-methylstilbene via reaction with the aniline adduct of 4,4'-diglycidyloxy-alphamethylstilbene, the director axis of the liquid crystalline domains corresponds to the molecular axis of the mesogen repeat.

In the above, the outer reflections in the WAX diffractograms of the xz and yz sample film alignments have strongest intensity in the meridinial regions. For both sample film alignments this corresponds to the z axis of the film, or the film thickness direction which is perpendicular to both draw directions. The interchain distance periodicity in the biaxially drawn liquid crystal film is thus ordered preferentially in the z direction or perpendicular to the directions of draw.

Thus, within the sample film, the liquid crystal domains are oriented in the x and y draw directions. Within the liquid crystal domains, the interchain distance between the polymer chains is ordered preferentially through the thickness direction, z, of the sample film. Such interchain orientation would result in a higher refractive index in the z direction within a liquid crystal domain than between domains. (In thin films cured under shear conditions, the polymer structure between liquid crystal domains exhibits monotropic orientation.) This would result in the spatial pattern of varying refractive index on a dimensional scale of the liquid crystal domain thickness. Biaxially drawing of this liquid crystal structure therefore results in the formation of a grating through the film thickness. The film thickness is much greater than the grating spacing which is dictated by the thickness of the liquid crystal domains. To achieve high grating strengths at visible wavelengths therefore only requires a small value for the amplitude of the refractive index modulation. High grating strengths result in high diffraction efficiencies and thus high reflectivity. The biaxially drawn film reported here has diffraction efficiencies in the range of 0.9 to 0.999, over the visible wavelength range and the observed reflective properties are thus metallic like.

COMPARATIVE EXPERIMENT A

Unoriented Film From 4,4'-Diglycidyloxy-alpha-methylstilbene and the Aniline Adduct of 4,4'-Diglycidyloxy-alpha-methylstilbene A portion (7.69 grams, 0.0431 epoxide equivalent) of 4,4'-diglycidyloxy-alpha-methylstilbene (178.4 EEW) prepared using the method of Example 1-B is placed in a forced air, convection type oven heated to 150° C. Forty minutes later, the 4,4'-diglycidyloxy-alpha-methylstilbene is fully melted and the oven temperature is decreased to 120° C. At this time, a portion (12.19 grams, 0.0431 >N—H equivalent) of an aniline adduct of 4,4'-diglycidyloxy-alphamethylstilbene (282.705 >NH EW) prepared using the method of Example 1-C is placed in the oven. After forty minutes, the 4,4'-diglycidyloxy-alpha-methylstilbene and the aniline adduct of 4,4'-diglycidyloxy-alpha-methylstilbene equilibrated to 120° C. are combined and stirred for 100 seconds while maintained in the 120° C. oven. At the end of this time, the resin blend is removed from the oven, degassed for one minute in a vacuum bell jar, then poured onto a glass plate pretreated with a mold release agent which is also in the 120° C. oven. Pouring of the resin blend is done in the center of the glass plate so as to induce the flow of the resin blend at approximately equal rates in all directions. The resin blend on the glass plate is covered with another mold release treated glass plate which also is preheated to 120° C. Spacing between the two glass plates is controlled by the placement of 0.0015 inch (0.0381 mm) stainless steel strips around the edges of the bottom glass plate. Twenty pounds of weight is placed on top of the glass plates to compress the resin blend, then the temperature in the oven is reduced to 80VC. The resin blend is isotropic (transparent) at this time. Curing is completed using the following sequential schedule: 4 hours at 80° C., one hour at 90° C., one hour at 100° C. and 4 hours at 110° C. The film recovered from the mold is white, opaque in appearance under front lighting conditions at all angles of incidence and has a thickness of 0.00725 inch (0.18415 mm). The film is only slightly translucent under back lighting conditions. Optical microscopy under crosspolarized light at 70× magnification reveals randomly distributed liquid crystalline textures and birefringent domains of approximately 5 microns in size around the edges of the film. The tensile properties are determined using the method of Example 1-E and are reported in Table II. For the tensile testing, a set of samples were cut from the casting and arbitrarily designated as the x-direction. A second set of samples were cut exactly at a 90 degree angle from the x-direction to provide the y-direction data.

TABLE II

| PROPERTY | VALUE |
| --- | --- |
| Tensile Strength: | |
| x-direction, psi | $11.3 \times 10^3$ |
| x-direction, Pa | $77.9 \times 10^6$ |
| y-direction, psi | $11.1 \times 10^3$ |
| y-direction, Pa | $76.532 \; 10^6$ |
| Tensile Elongation: | |
| x-direction, % | 5.1 |
| y-direction, % | 4.1 |
| Tensile Modulus: | |
| x-direction, psi | $500 \times 10^3$ |
| x-direction, Pa | $3,447 \times 10^6$ |
| y-direction, psi | $536 \times 10^3$ |
| y-direction, Pa | $3,696 \times 10^6$ |

What is claimed is:

1. A biaxially oriented film prepared from a curable composition comprising
    (A) at least one resin having an average of more than one vicinal epoxide or vicinal thiirane group per molecule; and
    (B) at least one curing agent and/or curing catalyst for said epoxy or thiirane resin; and wherein
        (1) at least one of (A) or (B) contains one or more rodlike mesogenic moieties which provides said film with liquid crystal domains prior, during or after curing;
        (2) component (B) is present in a quantity sufficient to cure component (A);
        (3) said liquid crystalline domain(s) have been biaxially oriented to provide a molecular grating throughout the film thickness; and
        (4) optionally, said curable mixture has been B-staged.

2. A biaxially oriented film of claim 1 wherein
    (1) component (A) is a diglycidyl ether of a bisphenol containing one or more rodlike mesogenic moieties; and
    (2) component (B) is an adduct formed by reacting a compound containing an average of more than one, but not more than about 2 vicinal epoxide groups per molecule with a stoichiometric excess of a compound containing an average of more than one, but not more than two hydrogen atoms reactive with an epoxide group, said adduct containing one or more rodlike mesogenic moieties.

3. A biaxially oriented film of claim 1 wherein
    (1) component (A) is 4,4'-diglycidyloxy-α-methyl stilbene; and
    (2) component (B) is an aniline adduct of 4,4'-diglycidyloxy-α-methyl stilbene.

4. A biaxially oriented film of claim 1 which has been B-staged.

5. A biaxially oriented film of claim 2 which has been B-staged.

6. A biaxially oriented film of claim 3 which has been B-staged.

7. The product resulting from curing the biaxially oriented film of claim 1.

8. The product resulting from curing the biaxially oriented film of claim 2.

9. The product resulting from curing the biaxially oriented film of claim 3.

10. The product resulting from curing the biaxially oriented film of claim 4.

11. The product resulting from curing the biaxially oriented film of claim 5.

12. The product resulting from curing the biaxially oriented film of claim 6.

13. The product resulting from curing the biaxially oriented film of claim 1 said product being a laminate or composite, adhesive or coating.

14. The product resulting from curing the biaxially oriented film of claim 2 said product being a laminate or composite, adhesive or coating.

15. The product resulting from curing the biaxially oriented film composition of claim 3 said product being a laminate or composite, adhesive or coating.

16. The product resulting from curing the biaxially oriented film of claim 4 said product being a laminate or composite, adhesive or coating.

17. The product resulting from curing the biaxially oriented film of claim 5 said product being a laminate or composite, adhesive or coating.

18. The product resulting from curing the biaxially oriented film of claim 6 said product being a laminate or composite, adhesive or coating.

* * * * *